Jan. 11, 1927.
J. T. STONEY ET AL
1,613,856
MOLDING MACHINE
Filed Sept. 9, 1921   10 Sheets-Sheet 9
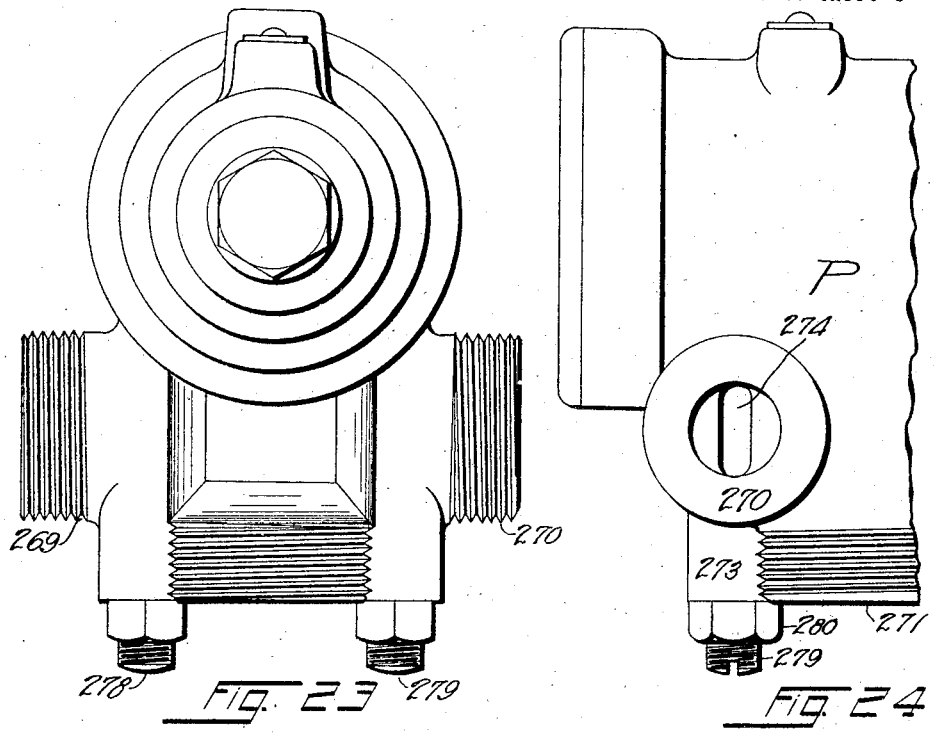
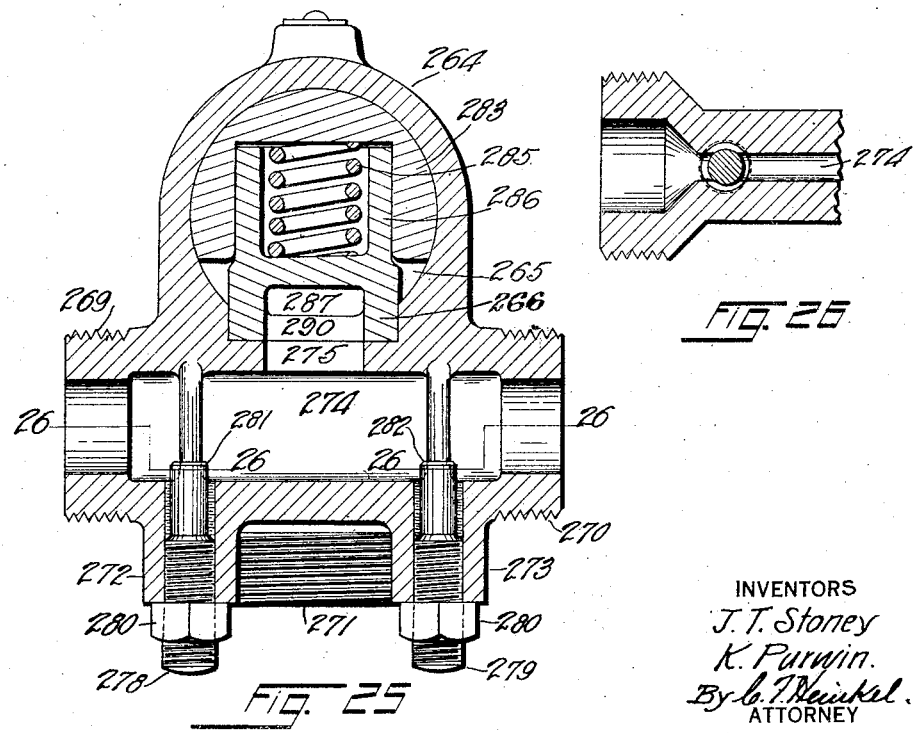
INVENTORS
J. T. Stoney
K. Purwin.
By C. T. Heinkel
ATTORNEY Jan. 11, 1927.

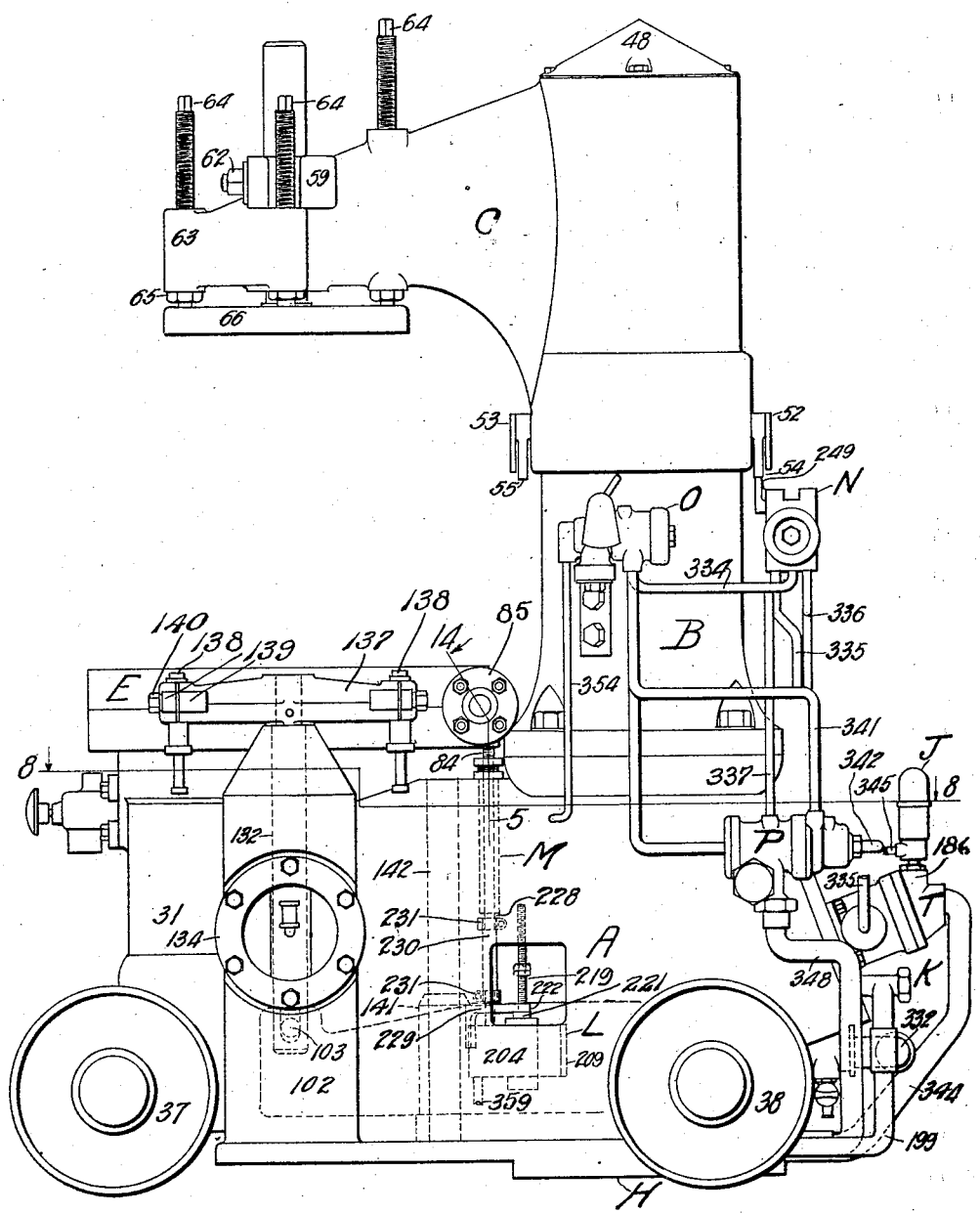

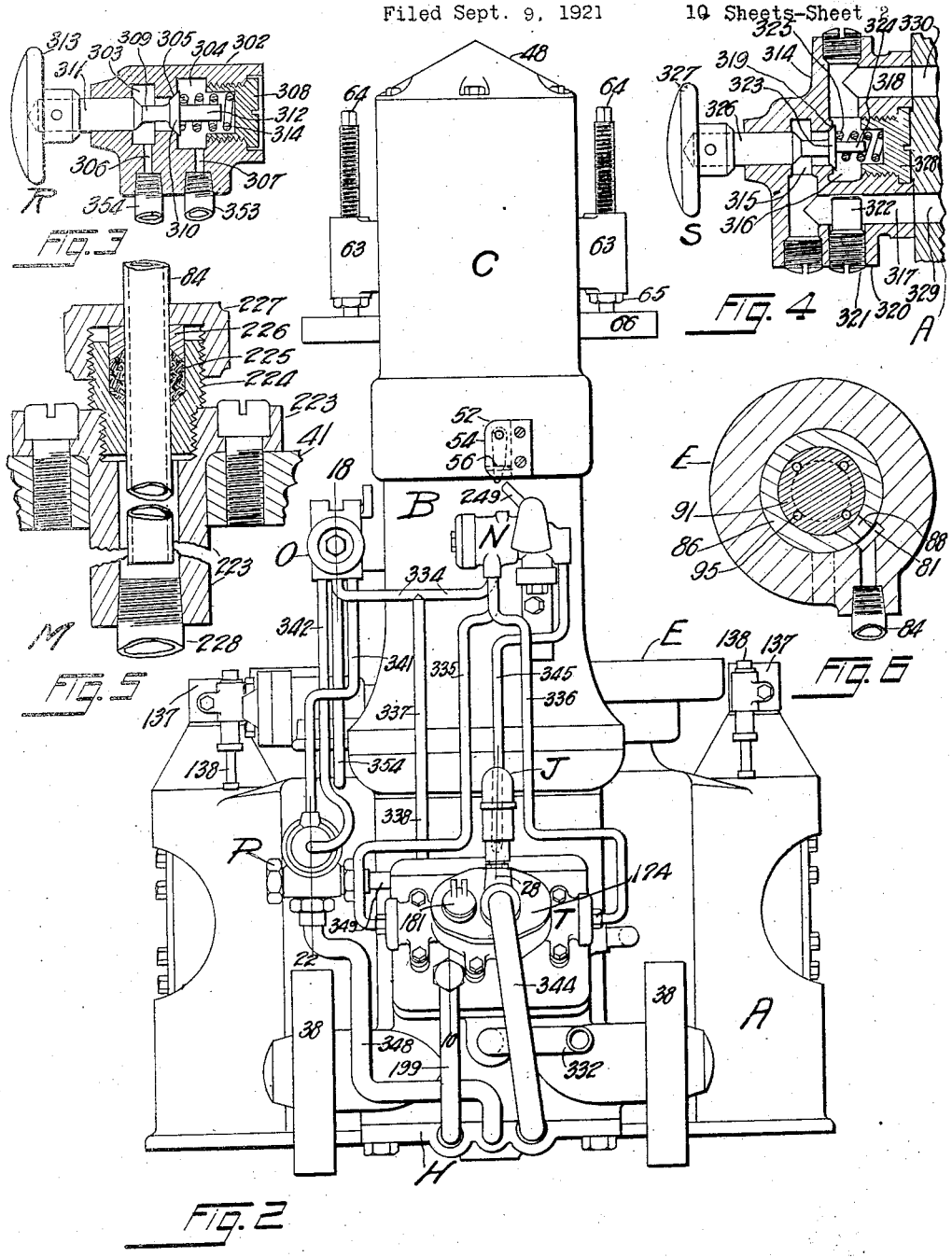

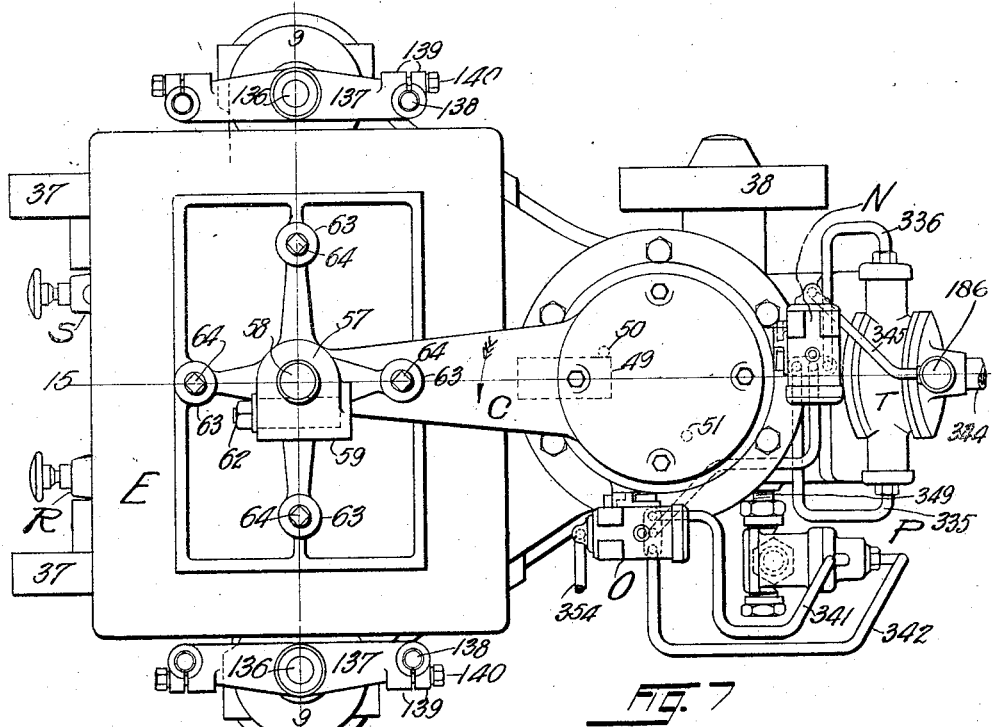
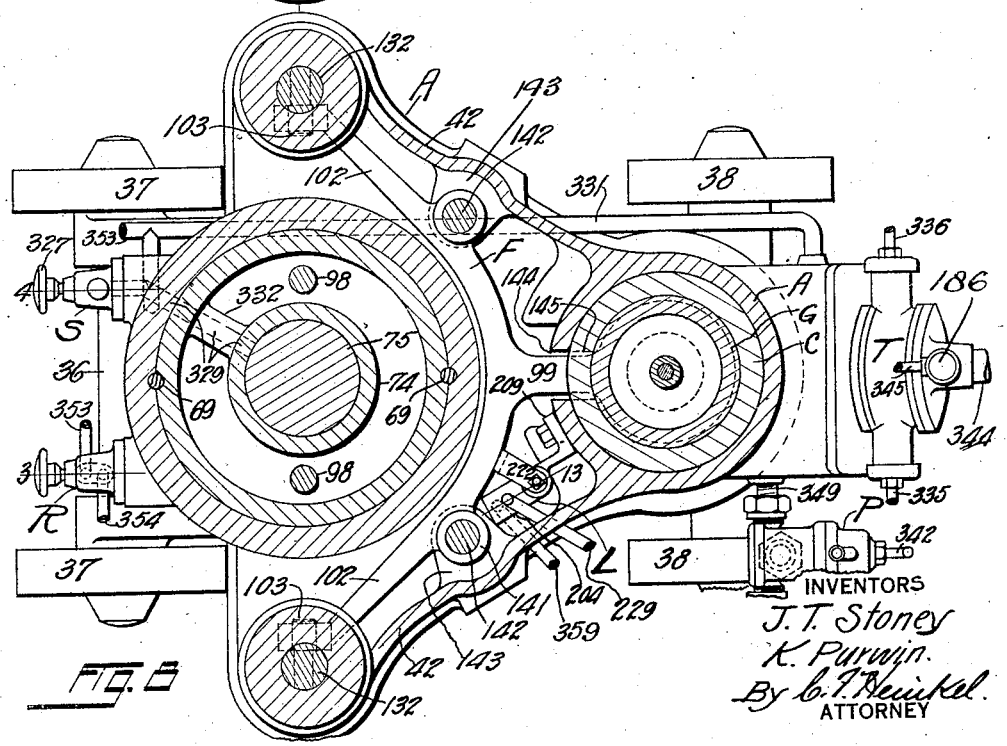

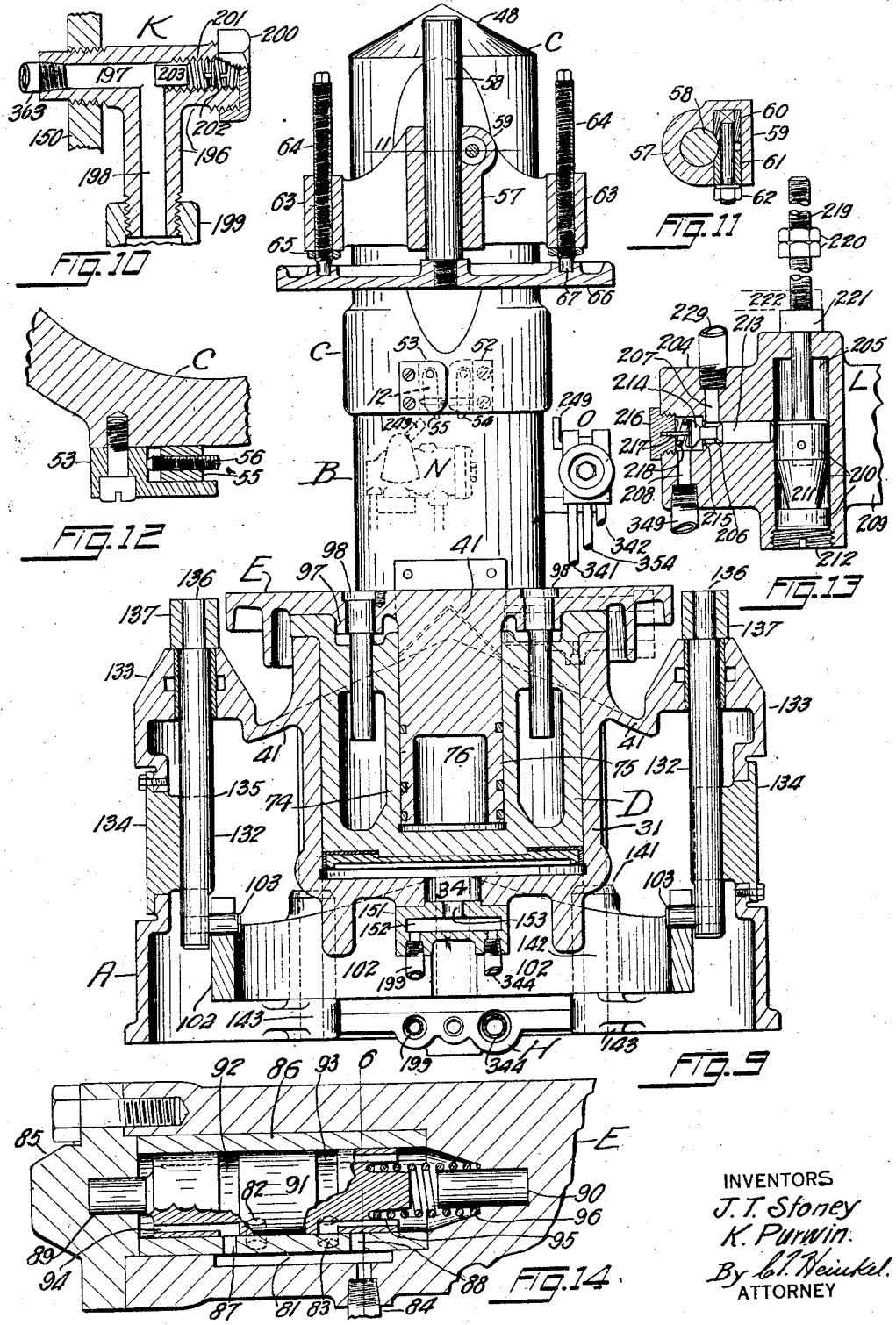

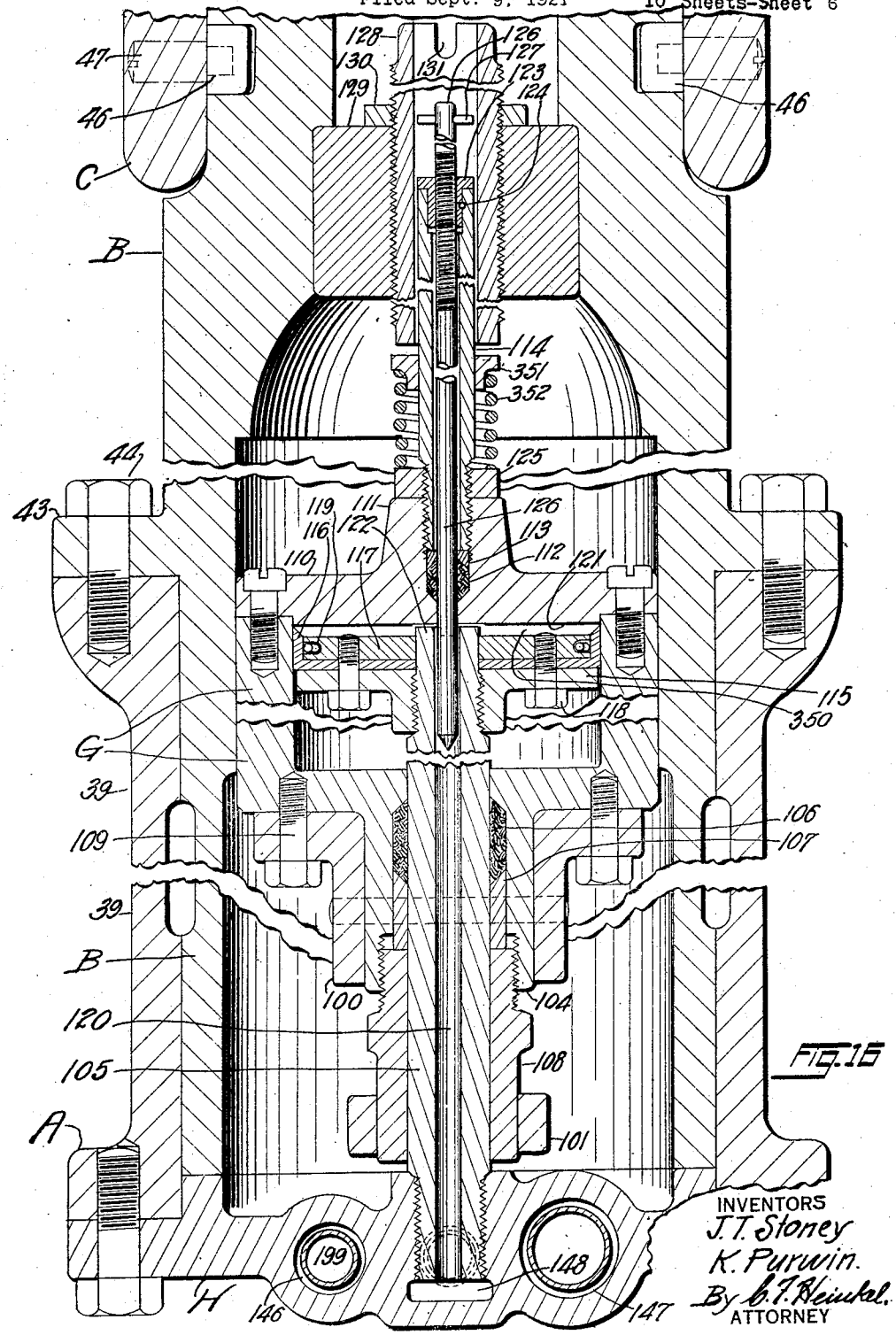

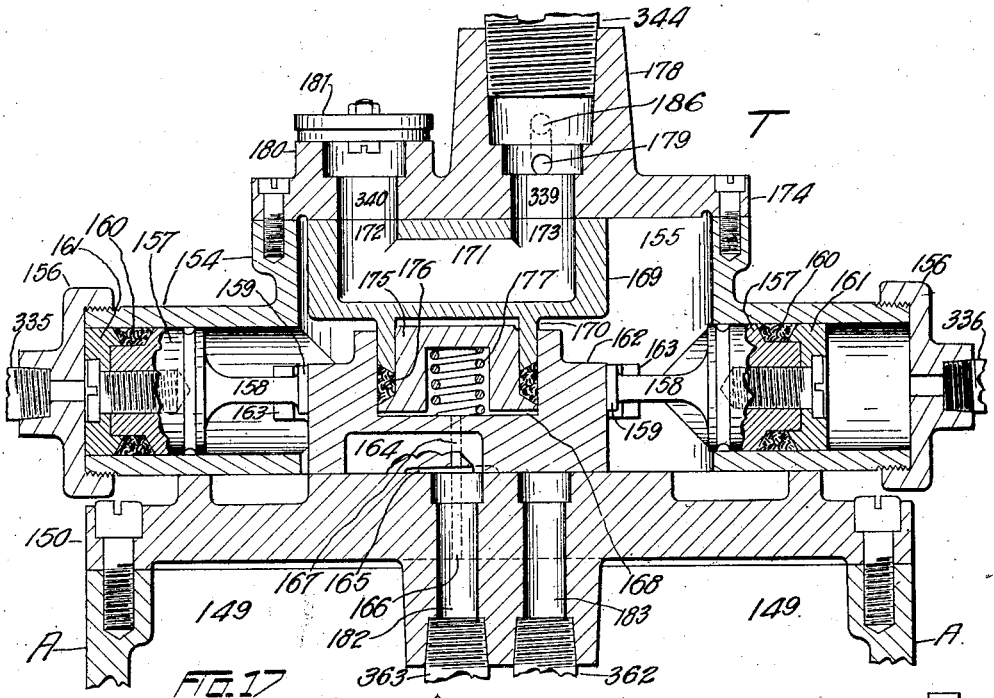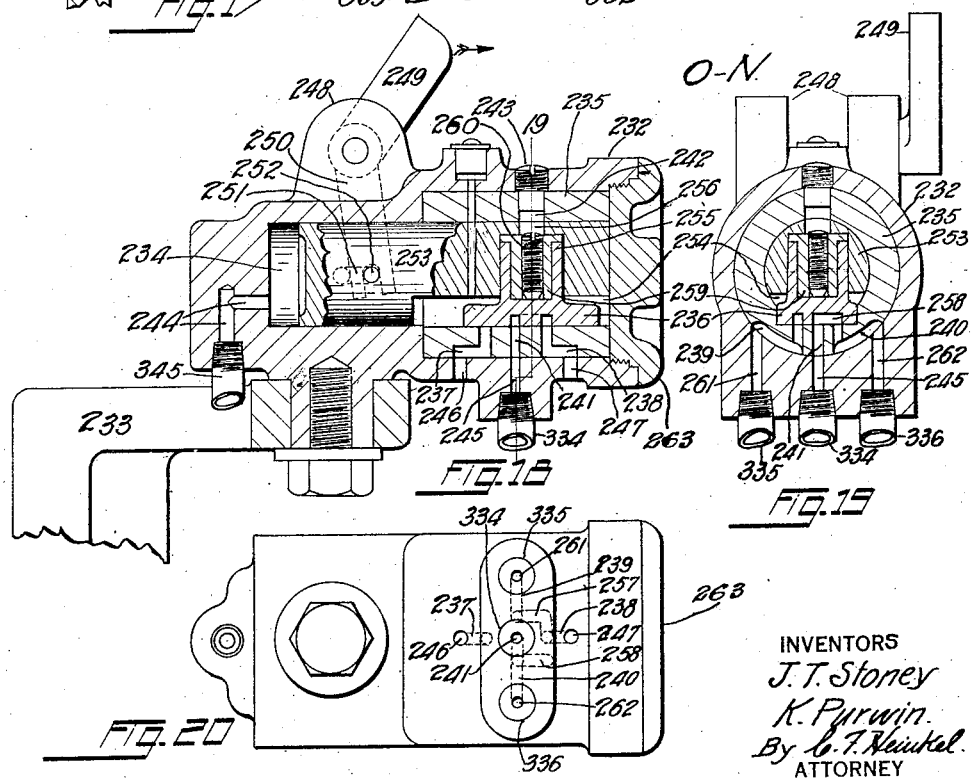

J. T. STONEY ET AL 1,613,856

MOLDING MACHINE

Filed Sept. 9, 1921   10 Sheets—Sheet 10

INVENTORS
J. T. Stoney
K. Purwin
By C. T. Heinkel
ATTORNEY

Patented Jan. 11, 1927.

1,613,856

UNITED STATES PATENT OFFICE.

JOHN T. STONEY AND KLEMENS PURWIN, OF CLEVELAND, OHIO, ASSIGNORS TO THE STONEY FOUNDRY ENGINEERING AND EQUIPMENT CO., OF CLEVELAND, OHIO, A CORPORATION OF OHIO.

MOLDING MACHINE.

Application filed September 9, 1921. Serial No. 499,501.

Our invention relates to molding machines generally, and to automatically operated molding machines particularly.

The object of our invention is a molding machine which is substantially automatic in operation, which has its working parts protected to prevent sand, etc., from injuring them, which is adjustable as to different sizes of patterns as well as to fluid pressure, and which is efficient in operation. Other objects will appear in the further pursuance of this specification.

Figure 15:
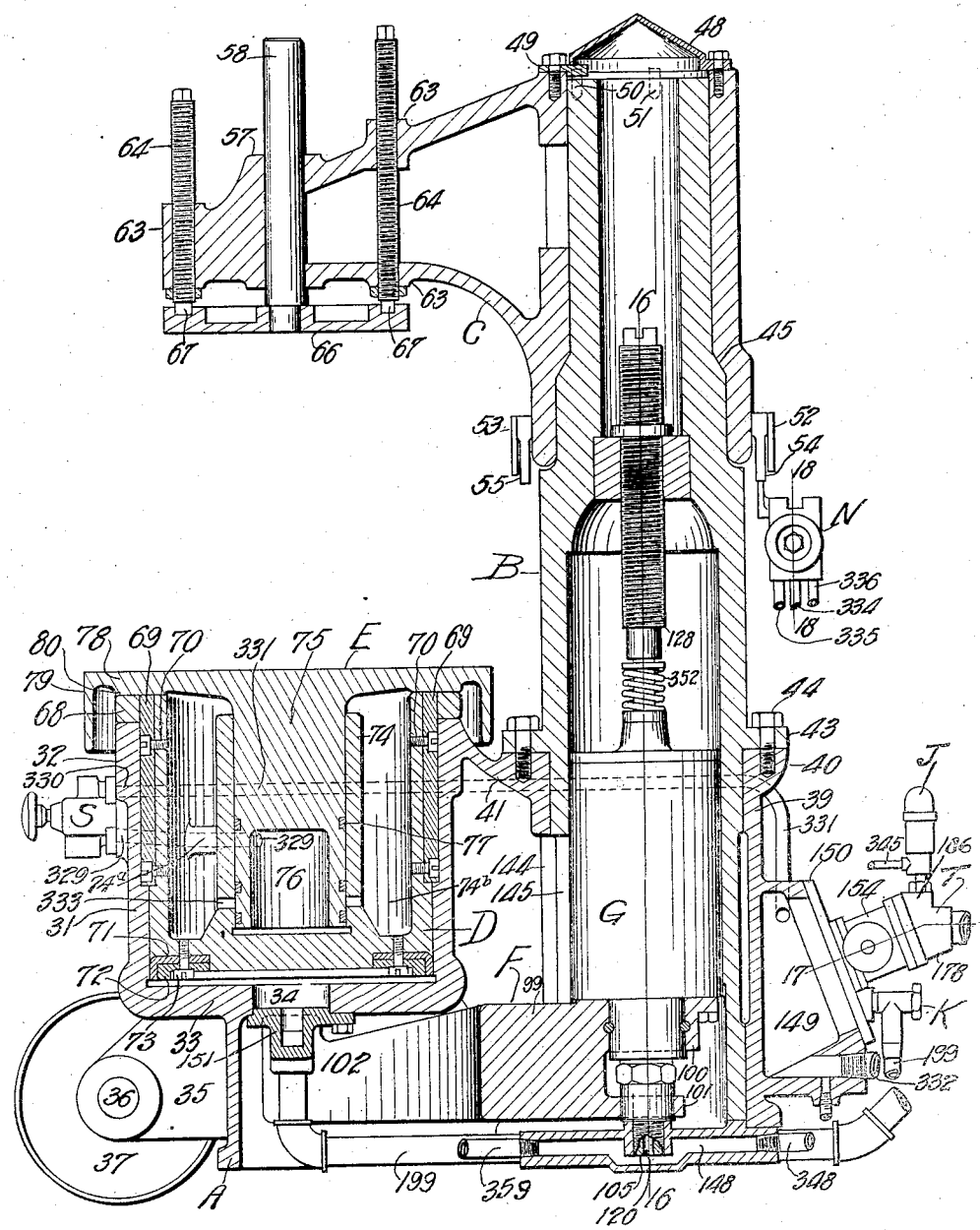
Figure 21:
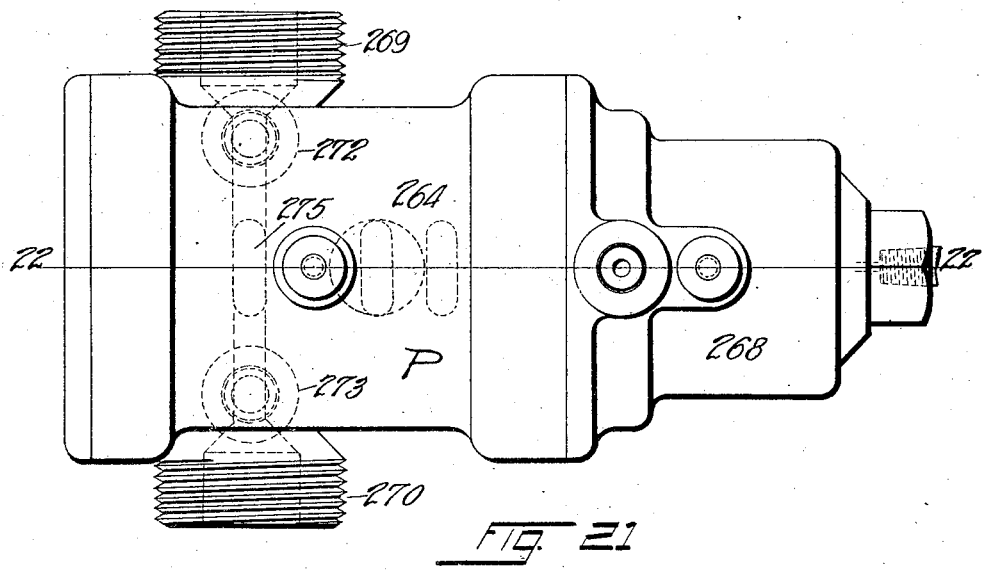
Figure 22:
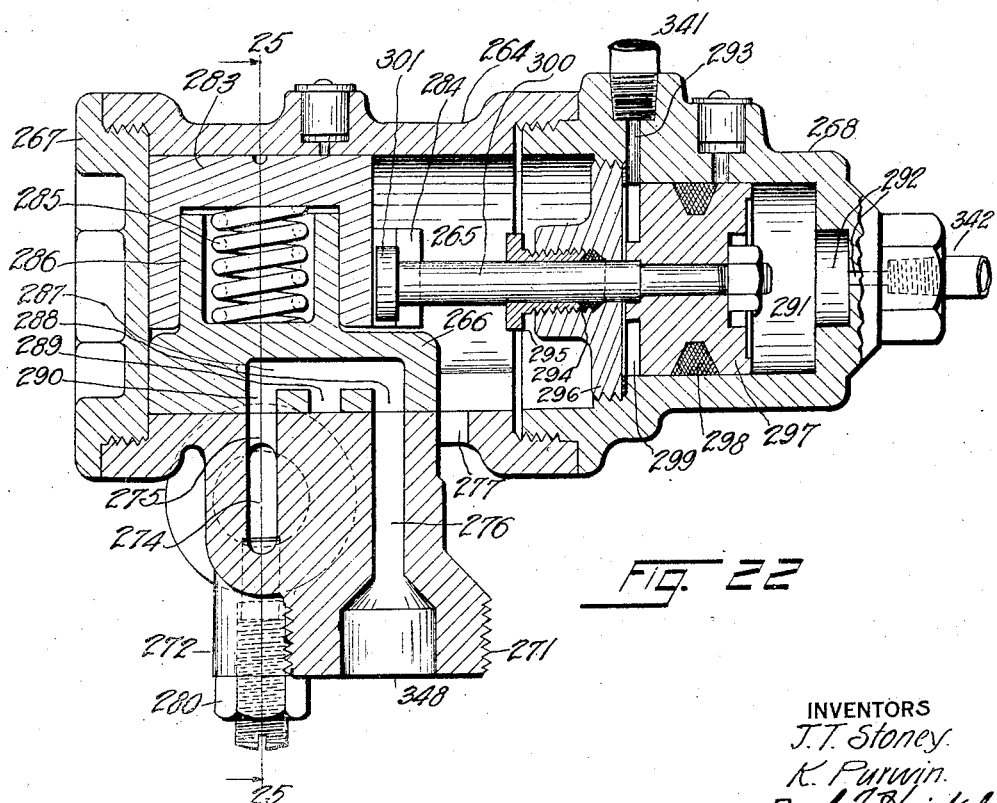
Figure 27:
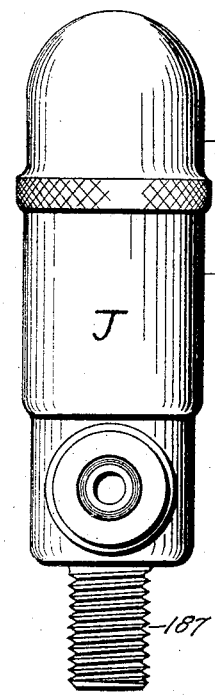
Figure 28:
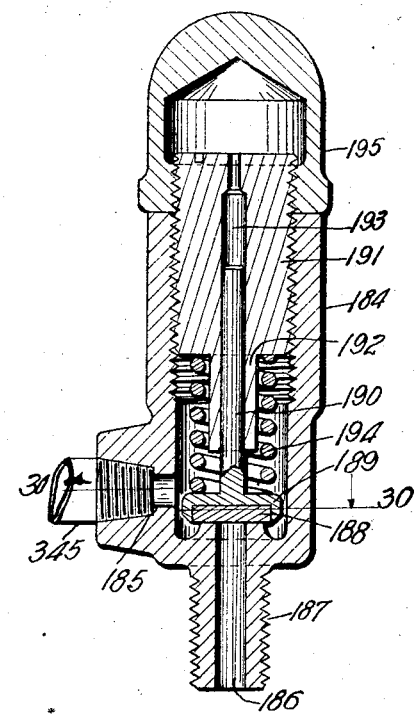
Figure 29:
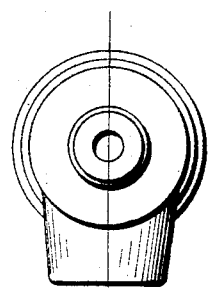
Figure 30:
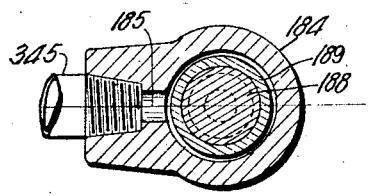

We attain these objects by the exemplification shown in the accompanying drawings which show a molding machine embodying the features of our invention, but are susceptible to changes and modification, and in which Fig. 1 is a general side elevation of a molding machine. Fig. 2 is a rear end elevation of Fig. 1; Fig. 3 is a section on line 3 of Fig. 8, showing a push valve on a larger scale; Fig. 4 is a section on line 4 of Fig. 8, showing another push valve on a larger scale; Fig. 5 is a sectional view on line 5 of Fig. 1, showing the upper end of the telescope joint on a larger scale; Fig. 6 is a section on line 6 of Fig. 14; Fig. 7 is a plan view of Fig. 1; Fig. 8 is a section on line 8 of Fig. 1; Fig. 9 is a section on line 9 of Fig. 7; Fig. 10 is a section on line 10 of Fig. 2, showing the adjuster on a larger scale; Fig. 11 is a section on line 11 of Fig. 9; Fig. 12 is a section on line 12 of Fig. 9; Fig. 13 is a section on line 13 of Fig. 8, showing the jar and vibrator valve mechanism on a larger scale; Fig. 14 is a partial section on line 14 of Fig. 1, showing vibrator on a larger scale; Fig. 15 is a section on line 15 of Fig. 7; Fig. 16 is a section on line 16 of Fig. 15, showing strip cylinder mechanism on a larger scale; Fig. 17 is a section on line 17 of Fig. 15, showing the valve mechanism on a larger scale; Fig. 18 is a section on line 18 of Figs. 15 and 2, showing the valve mechanism on a larger scale; Fig. 19 is a section on line 19 of Fig. 18; Fig. 20 is a bottom view of Fig. 18; Fig. 21 is a plan view of Fig. 22; Fig. 22 is a section on line 22 of Fig. 2, or Fig. 21, showing the valve mechanism on a larger scale; Fig. 23 is an end view of Fig. 21; Fig. 24 is a partial side view of Fig. 23; Fig. 25 is a section on line 25 of Fig. 22; Fig. 26 is a section on line 26 of Fig. 25; Fig. 27 is a side view of Fig. 28; Fig. 28 is a section on line 28 of Fig. 2; Fig. 29 is a bottom view of Fig. 27; Fig. 30 is a section on line 20 of Fig. 28.

Similar reference characters refer to similar parts throughout the views.

The main parts of the molding machine shown on the drawings are the base A, the column B arising from the base A, the arm C rotatably mounted from the upper end of the column, the squeeze piston D carried by the base at one side of the column, the jar table E carried by the piston D, and the strip arm F associated with the table. The pipe or other connections between the valves and other elements are shown in plain lines and are located on the drawings where most convenient for clearness.

The base A upon which the entire mechanism is mounted has a cylinder portion 31 which has an enlarged anvil portion 32 on its upper end, and a closed bottom 33 provided with an opening 34. Two ears 35 are provided on the front of the machine to receive the axle 36 upon which supporting wheels 37 are mounted. Another axle is mounted in the rear portion of this base, and rear supporting wheels 38 are mounted on this axle. This base A further has, at the rear end thereof, an upright sleeve portion 39, the sleeve being provided with an outwardly projecting flange 40 at its upper end. The cylinder portion 31 and sleeve portion 39 are connected by the top wall 41 which inclines downward toward each side of the machine so that sand or other things falling thereon may readily roll off therefrom and not pile up thereon and interfere with the down movement of the table E. The portions 31 and 39 are further connected by side walls 42 which extend down from the top wall 41 and are integral therewith. This construction provides a light weight but rigid base.

The lower end of the column B fits into the upright sleeve portion 39 of the base A and has a flange 43 adapted to rest upon the flange 40 at the top of the sleeve 39, the column B being secured to the base A by screws 44 passing through the flange 43 of the column B into the flange 40 of the sleeve 39.

The rotatable arm C is provided with a sleeve portion journaled on the upper end of the column B and is prevented from downward movement by a shoulder 45 on the column B and from upward movement by a diametrically split key-ring 46 secured to the sleeve of the arm C which fits into a circumferential groove in the column B the ring being held in position in the arm by pilot screws 47 which are threaded in the arm C. (See Figs. 15 and 16.)

On the upper end of this journal portion of the arm C is fastened a cap 48 which has a slot into which the stop block 49 fits, the block 49 being rigidly secured to the arm C. This stop block, upon rotation of the arm C, engages either of two spaced stop pins 50 and 51 which are mounted in the upper end of the column B to limit the turning movement of the arm.

This journal portion also carries brackets 52 and 53 adjacent the bottom thereof in which fingers 54 and 55 are hinged. Adjusting screws 56 are threaded into the fingers 54 and 55 and are adapted to engage with the brackets for the purpose of adjustably limiting the movement of these fingers, the fingers 54 and 55 being free to swing in one direction but restrained by the brackets against movement in the opposite direction.

The front portion of the arm C has a central boss 57 with an opening in which a vertical guide pin 58 fits slidably. On the upper end this boss 57 has an ear 59 which has a counterbore in which clamp bushings 60 and 61 are mounted as shown in Fig. 11. The bolt 62 passes through these bushings and firmly clamps the pin 58 to the boss 57 when the bolt 62 is tightened.

This front portion of the arm C also has bosses 63 into which adjusting screws 64 are threaded, lock nuts 65 being provided on these screws to lock the same in adjusted position as shown in Figs. 1, 9 and 15.

A plate 66 is secured to the lower end of the guide pin 58 and has four countersunk openings in the upper side thereof into which the pilots 67 of the screws 64 fit loosely diametrically, but bottom therein.

The squeeze piston D fits into the portion 31 of the base A and, as shown in Figs. 9 and 15, has a collar 68 at its upper end which serves as an anvil upon which the table E strikes when jarring a mold. Rotation of the piston D in the portion 31 is prevented by keys 69 which are held in position on the piston by screws 70.

To prevent leakage, the lower end of the piston D is provided with a cup washer 71 held in position by a clamp plate 72 and screws 73.

Concentrically with its outer circumference, the piston D has an inner cylinder 74 which is open at the top but closed at the bottom.

The table E which is supported on the squeeze piston D has a piston portion 75 which fits in the inner cylinder 74 of the piston D and is provided with a chamber 76 in the lower end thereof and piston rings 77. On the upper end of this piston portion 75 is the table proper 78 which has depending edge flanges 79 for stiffeners and a thickened portion with the flanges 79 forming an anvil surface 80 which normally rests upon the anvil collar 68 on the piston D.

On one side, as shown in Fig. 14, the table E has a horizontal bore which is open at the outer end and adapted to receive the vibrator mechanism. Opening into this bore is a channel 81 and exhaust openings 82 and 83 angularly offset with respect to the channel. Opening into the channel 81 is an inlet pipe 84.

The open end of this bore is closed by a cap 85. A bushing 86 is mounted in this bore and has spaced openings 87 and 88 always in communication with the chamber 81. An anvil block 89 is mounted in the cap 85; at the outer end of the bore a second anvil block 90 is mounted in the table E at the inner end of the bore. Each block projects some distance outside of its mounting, as clearly seen in Fig. 14. A plunger 91 is mounted in the bushing 86 between the anvil blocks 89 and 90 and has spaced circumferential grooves 92 and 93 which are so spaced that when either groove registers with its inlet opening 87 or 88, the other groove registers with its outlet opening 82 or 83. Between each outer end of the plunger and the corresponding groove are longitudinal openings 94 and 95 which permit flow of fluid from the grooves to the adjacent ends of the piston. A spring 96 is provided at the inner end of the plunger to push the plunger against the anvil block 89 when the vibrator is not in use, so that, no matter in what position the plunger is in when the fluid pressure is shut off, this spring will always return the plunger to the starting position, as shown in Fig. 14, and the vibrator will start upon supply of fluid pressure thereto through the inlet pipe 84.

It is noted that the casing for this vibrator is integral with the table E. It has been found that a vibrator made up as a unit and bolted to a machine will soon come loose owing to the sharp blows delivered by the plunger in opposite directions against the ends of the vibrator. This feature of mounting the vibrator mechanism in the machine body itself eliminates the major portion of the above objection.

The table E also has outwardly projecting bosses 97, as best shown in Fig. 9, in which guide pins 98 are secured. These guide pins extend downward and operate in openings provided in bosses which connect the upper portion of the inner cylinder portion 74 to the outer wall of the piston D.

The strip arm F, as best shown in Figs. 8, 15 and 16, has a body portion 99, one end of which extends into the hollow lower end portion of the column B and terminates in ears 100 and 101, while the other end thereof is forked and terminates in prongs 102 which extend on opposite sides of the squeeze piston D, the ends of the prongs having grooves adapted to receive pins 103.

The strip cylinder G fits, slidably, into the lower portion of the column B, as best shown in Figs. 15 and 16, and has a reduced sleeve portion 104 at the lower end thereof, which has an opening for a vertical piston rod 105 which is secured to the base, a packing 106, a packing gland 107 engaging the packing and a threaded sleeve 108 screwed into the lower end of the sleeve portion 104 and adapted to be tightened against the gland 107. This reduced portion 104 fits into the ear 100, the strip arm F of which is flanged to accommodate the screws 109 by means of which the cylinder G is secured to the ear 100. The lower end of the sleeve 108 fits into the lower ear 101 of the strip arm which also serves as a stabilizer for the lower end of the piston rod 105.

The upper end of the cylinder G is closed by a head 110 which has a central upwardly projecting boss 111 into which a packing 112 and a packing gland 113 are mounted, and into which a sleeve 114 is threaded.

Within the cylinder G is a piston 115 threaded to the upper end of the piston rod 105. A cup washer 116 lies against the upper face of the piston and is held there by a washer 117 and screws 118. A spring 119 is provided around the periphery of the washer 116 to force the circumferential flange of the cup washer 116 outward against the cylinder wall.

The piston rod 105 has an axial opening 120 extending all the way through, and the lower end of the rod 105 is threaded into a cap H which is bolted to the base A, so that the piston rod 105 and the piston 115 remain stationary when the strip mechanism is in operation. When the cylinder G is in its lowest position, the upper end of the piston rod 105 terminates a short distance below the inner face 121 of the upper head 110, thereby leaving a narrow space 122 between the upper end of the piston rod and the inner face 121 of the head.

The lower end of the sleeve 114 is threaded into the boss 111 and serves also as a packing tightener there, while the upper end thereof has a threaded bushing 123 secured thereto by a pin 124. The bushing 123 has a slot for a screw driver, so that the tube 114 may be rotated for the purpose of adjusting or tightening the packing 112 without removing any of the parts from the machine.

The sleeve 114 is locked in adjusted position by a nut 125 which bears against the upper end of the boss 111.

A rod 126 is threaded into the bushing 123 and extends some distance upward therefrom the pin 127 being provided adjacent the upper end thereof to facilitate rotation of the rod 126 for the purpose of adjustment. This rod 126 also extends downward through the sleeve 114 and the head 111, and some distance into the opening 120 of the piston rod 105. The lower end of the rod 126 is pointed similar to a valve, and the diameter of the rod 126 is smaller than the diameter of the opening 120.

The upper end of the sleeve 114 is inclosed in a sleeve 128 which is threaded into a block 129. This block 129 is secured to the inside of the column B at a suitable distance above the cylinder G. This sleeve 128 is locked in adjusted position by the nut 130 which engages the block 129, and has a slot 131 in its upper end to facilitate rotation thereof for the purpose of adjusting the strip height.

The front ends 102 of the strip arm F engages the pins 103, as previously set forth. These pins 103, as best shown in Fig. 9, are driven into the lower end of vertical push bars 132 which fit, slidably, in bosses 133 provided on the base A. These push bars 132 further have a bearing in bearing blocks 134 which are mounted on the base A below the bosses 133 and are cut away on their inner ends at 135 to permit the ends 102 of the arm F to pass them in their upward movement. Each of the bars 132 has a reduced upper end portion 136 which fits into the strip bars 137 which extend along opposite sides of the table E.

The strip bars 137, as best shown in Figs. 1 and 7, have openings on each end into which vertical adjusting screws 138 are threaded, and these ends are split and have ears 139 and screws 140 to clamp the screws 138 in adjusted position. The upper surfaces of the strip bars 137 normally lie below the upper surface of the table E, and the upper ends of the screws 138 project above the upper surface of the bars 137.

The strip arm F, as shown in Figs. 1, 8 and 9, has bosses 141 in which fixed vertical guide bars 142 fit slidably. The upper ends of these bars 142 are mounted in the top wall 41 of the base A, while the lower ends thereof are mounted in bosses 143 provided for that purpose on the base A. For the purpose of permitting the portion 99 of the strip arm F to move up and down freely, the sleeve portion 39 of the base A has the vertical slot 144 through which the rear end of the strip arm extends, while the lower portion of the column B has the slot 145 registering with the slot 144 as shown in Fig. 8.

The cap H is bolted to the base A beneath the column B and has openings 146 and 147, shown in Figs. 15 and 16 both extending horizontally all the way through the cap and also has the chamber 148 which also extends all the way through the cap between the openings 146 and 147 and terminates into a threaded opening at each end, and also has a threaded opening in the top thereof to receive the threaded end of the piston rod 105.

A main fluid pressure chamber 149 is provided on the base A adjacent the lower end of the column B and is closed on its outer end by a cover 150 as shown in Fig. 15.

A cap 151 is bolted to the bottom of the cylinder 31 and over the opening 34, and has a chamber 152, an opening 153 communicating with the opening 34, and threaded openings to receive the pipes 199 and 344, as shown in Fig. 9.

The valve T has a case 154 bolted to the cover 150 of the main pressure chamber 149 as shown in Figs. 15 and 17, and has a longitudinal bore at each end communicating with a central opening 155 perpendicular thereto. The outer ends of these longitudinal bores are closed by caps 156 which have threaded openings, as shown in Fig. 17.

Pistons 157 are mounted in the longitudinal bores of the valve T and have projections 158 provided with heads 159 on the inner ends thereof; and also have reduced portions to receive packings 160 and packing glands 161 which are bolted to the pistons.

Within the opening 155 substantially midway between the pistons 157 is valve 162 which is adapted to slide on the cover 150 and which has ears 163 on each end adapted to engage the heads 159 to move the pistons 157 back and forth with the valve. This valve 162 also has a chamber 164 on the underside thereof and, adjacent thereto, a chamber 165 which communicates with openings 166 and 167 through the cover 150 of the main pressure chamber 149. This valve 162 further has a counterbore 168 in the outer side thereof to receive the valve 169.

The valve 169 moves with the valve 162 and has a tubular projection 170 fitting in the counterbore 168 of the valve 162. The valve 169 has an interior chamber 171, provided with chamber openings 172 and 173 to the outer side thereof, and is adapted to slide on the under side of a cover 174 which closes the outer end of the central opening 155.

Within the counterbore 168 is mounted a packing gland 175 and a packing 176 held in engagement with the tubular portion 170 by a spring 177, as shown in Fig. 17.

The cover 174 is bolted to the valve case 154 and has an opening 339 through a boss 178, and an opening 340, said openings being adapted to register with the openings 173 and 172; and also has the opening 179 communicating with the openings 173 and 186 and with the pipe 345 through the valve J. The cover 174 further has the boss 180 which has an opening which communicates with the opening 172 through the opening 340 and the outer end of which is closed by the cover 181 which is hinged to the cover 174 as best seen in Fig. 2.

The chamber 164 is so arranged, in relation to openings 182 and 183, that the opening 183 in the cover 150 is closed when the valve is in position shown in Fig. 17, and that the openings 182 and 183 both communicate with the chamber 164 when the valve 162 is at the opposite end of its stroke.

The spring 177 tends to keep the valves 169 and 162 upon their respective seats and is aided in that action by fluid pressure which enters the counterbore 168 from the pressure chamber 149 through opening 166 in the cover plate 150, the chamber 165, and the opening 167 in the valve 162 thereby pressing the valve 169 upward and the valve 162 downward.

The pressure regulator J, shown in detail in Figs. 27, 28, 29 and 30, is connected to the valve T and consists of a case 184 which is threaded internally and which has a lateral threaded opening 185, an end opening 186 in communication with the opening 179 in the cover 174 of the valve case 154, and the threaded portion 187 which screws into the cover 174.

Inside of the case 184 and over the opening 186 is a washer 188, preferably of leather, which washer fits into a head 189 on the slidably mounted stem 190. An adjusting plug 191 is screwed into the case 184 and projects outside of the upper end thereof and has a reduced portion 192 and an axial opening 193 in which the stem 190 fits slidably.

A spring 194 is interposed between the plug 191 and the head 189 to normally hold the washer 188 over the opening 186 and close the same. A cap 195 is threaded to fit the upper end of the plug 191 and closes the top of the case 184 and serves also to lock the plug 191 in adjusted position.

The adjuster K, shown in detail in Fig. 10, has the case 196 which screws into the cover 150. This case 196 has the openings 197 and 198. The outer end of the opening 197, as well as the outer surface of the lower outer ends of the case 196 are threaded. The coupling 199 is screwed onto the lower threaded end, and the cap 200 is screwed onto the outer threaded end to close one end of the opening 197. The adjusting plug 201 and the lock nut 202 are screwed into the internally threaded portion of the opening 197. The plug 201 has the pilot 203 which is adapted to increase or decrease the area of the opening between the openings 197 and 198 by a rotating manipulation of the plug 201 to thereby increase or decrease the flow of fluid pressure between the openings 197 and 198.

The vibrator valve L, shown in detail in Fig. 13, has the body 204 which has the main bore 205 the outer end of which is threaded, the opening 206 extending laterally from the bore 205 the outer end of which is threaded and the openings 207 and 208, extending laterally from the opening 206, the body 204 being fastened to the column receiving sleeve 39 by means of the arm 209.

Within the bore 205 is a plunger 210, each end of which fits the bore, and the middle portion 211 of which is tapered. A plug 212 screws into the lower threaded end of the bore 205 and closes the bore at the bottom.

A valve plunger 213 fits within the opening 206, and the valve portion 214 thereof is adapted to seat itself on a valve seat 215 within the opening 206. The opening 207 is located on one side of the valve seat 215 while the opening 208 is located on the other side thereof. A plug 216 is screwed into the threaded outer end of the opening 206 and has a bore into which the guide 217 of the valve 213 fits slidably. A spring 218 is interposed between the valve portion 214 and the plug 216 and is adapted to push the valve 213 toward its seat 215 and toward the plunger 210. The lower end of an adjusting rod 219 is pinned to the plunger 210 while the upper end thereof is threaded and carries lock nuts 220. At a suitable distance above the plunger 210, the rod 219 has a collar 221 which limits the downward movement of the plunger 210.

An actuating arm 222 is fastened to the strip arm F as shown in Fig. 1, and engages the nuts 220 in its upward movement, thereby raising the plunger 210. When the plunger is so raised to the point where the taper portion 211 is opposite the valve 213, the spring 218 presses this valve 213 against this taper side and the valve 204 begins to close and is entirely closed when the smallest part of the taper portion 211 is opposite the valve 213, thereby closing communication between the openings 207 and 208.

The telescope joint M, the upper end of which is shown in detail in Fig. 5, is composed of a flanged sleeve 223 which is bolted to the top wall 41 of the base A. The upper and lower ends of the sleeve 223 are internally threaded. A packing sleeve 224 is screwed into the upper end of the sleeve 223 and contains a packing 225, a packing gland 226, and has a cap 227 threaded to its upper end to tighten the packing 225.

The pipe 84, the lower end of which extends through the packing sleeve 224, projects above the cap 227 and screws into the vibrator case on the table E, as previously mentioned, and projects downward within the sleeve 223 sufficiently far to prevent its leaving the packing joint when the table E is raised to its highest point.

A pipe 228 is screwed into the lower end of the sleeve 223 and projects a short distance there-below. A pipe 229 is screwed into the vibrator valve L in communication with the opening 207 and extends a short distance upward. A hose 230 is applied over the upper end of the pipe 220 and the lower end of the pipe 228 and is held there by clamps 231. This arrangement permits the table E, to which the pipe 84 is secured, to move up and down without interrupting the flow of fluid pressure.

The starting valves N and O are substantially alike, and are shown in detail in Figs. 18, 19 and 20. These valves have a case 232 which is secured to the column B in a suitable location by a bracket 233.

This case 232 has a central bore 234, and has a bushing 235 at one end thereof the bore of which is the same as the bore 234 but having a flat surface at the bottom upon which the valve 236 slides. Ports 237, 238, 239 and 240, and an opening 241 are provided in the sleeve 235 as shown. This sleeve 235 also has an opening 242 for the pilot of a screw 243 which is threaded into the case 232 to prevent rotation of the sleeve. The case 232 further has a port 244 in communication with the bore 234 at the end opposite that in which the sleeve 235 is located and a port 245 in communication with the opening 241, and exhaust ports 246 and 247 spaced to suit the ports 237 and 238 in the sleeve 235.

The case 232 further has ears 248 in which a lever having arms 249 and 250 is pivoted and also has a slot 251 in one side through which a pin 252 passes.

The lever arm 249 is adapted to be engaged by the pivoted fingers 55 carried by the rotatable arm C, and the lever arm 250 has a slot at its lower end which receives the pin 252 which is secured to a plunger 253 slidable in the bore 234 and projects out through the wall of the case 232 and into this slot.

The plunger 253 fits into the bore 234 and into the bore of the sleeve 235, and is partly cut away at 254 to accommodate a valve 236, and has an opening in which the shank 255 of the valve is mounted, and further has an opening 256 located to correspond to the opening 242 in the sleeve 235.

The valve 236 has L shaped ports 237 and 238 suitably located in the bottom thereof and valve shank 255 is hollow and has a bushing 259 fitted therein. The bushing 259 has an adjusting screw 260 therein for the purpose of holding the valve 236 upon its seat, which is accomplished by rotating the screw 260 until the point thereof engages the valve 236, the threads thereof forcing the bushing 259 upward against the bottom of the opening in the plunger 253 and the valve against its seat. The registering openings 242 and 256 permit the introduction of a screw driver to manipulate the screw 260 when the screw 243 is removed.

Ports 261 and 262 are provided in the case 232 on opposite sides of the port 245 and are in communication with the ports 239 and 240 respectively, in the sleeve 235.

The cap 263 closes the end of the case 232 adjacent which the sleeve 235 is located.

The strip valve P, shown in detail in Figs. 21, 22, 23, 24, 25 and 26, has a case 264 which is provided with a central bore 265, flattened at the bottom to accommodate a valve 266, and threaded at one end to receive a cap 267 and at the other to receive a cylinder 268. Below the bore 265, the case has externally threaded bosses 269 and 270 on its sides, and an externally threaded boss 271, and internally threaded bosses 272 and 273 on its bottom.

A slot 274 extends all the way through the bosses 269 and 270 and the case 264, and terminates in a circular opening at each end, and intermediate its ends is in communication with the central bore 265 through the slot 275.

A slot 276 extends through the boss 271 terminating in a circular opening at its lower end, and being in communication with the bore 265 at its upper end.

The case 264 has an exhaust opening 277.

Adjusting screws 278 and 279 fit into threaded openings in the bosses 272 and 273, and are provided with lock-nuts 280 to lock the screws in adjusted position, and at their upper ends with the pilots 281 and 282 which may be adjusted into the slot 274 for the purpose of increasing or diminishing the area of the slot 274 at that point thereby increasing or diminishing the flow of fluid pressure and permit a flow of one capacity from one outlet, and of another capacity at the other outlet.

A hood 283 is provided with a valve 266 which has ears 284, and also has a bore to receive the hollow shank 286 of the valve 266. The main body of this hood 283 fits into the bore 265 but is cut away at the bottom to accommodate the valve 266.

A spring 285 is mounted within the hollow shank 286 of the valve 266 and is interposed between the hood 283 and the valve 266 to hold the valve down upon the flattened seat. The valve 266 which slides on the flattened bottom surface of the central bore 265 has a chamber 287 formed therein and spaced ports 288, 289 and 290 extending from the chamber to the bottom face of the valve.

The cylinder 268 which is screwed into one end of the case 264 has the bore 291 in axial alignment with the bore 265 and is provided with openings 292 and 293 in the outer end and adjacent the inner end. The inner end of this bore 291 is closed by a head 296 which is screwed into the inner end of the cylinder 268, and is made fluid tight by means of a packing 294 and a packing gland 295.

The piston 297 fits into the bore 291 and has a circumferential packing 298 and a recessed inner portion 299.

One end of a piston rod 300 is secured to the piston 297 while the other end thereof has a head 301 which engages the ears 284 of the hood 283 of the valve 266 to loosely take hold of the hood 283 and move the same and the valve 266 back and forth.

The push valve R, shown in cross-section in Fig. 3 has a case 302 which is provided with spaced chambers 303 and 304, the valve seat 305, between the chambers and openings 306 and 307 through the wall thereof to said chambers. One end of the case 302 is closed by a threaded and hollow plug 308.

A valve 309 is mounted in the case 302, and has a valve portion 310 adapted to the seat 305 and shank portions 311 and 312 on opposite sides of the valve portion. A push knob 313 is pinned to the end of the shank portion 311 and the shank portion 312 guides a spring 314 which is interposed between the valve 310 and the plug 308 to normally hold the valve to its seat.

The push valve S is secured to the cylinder portion 31 of the base and has a case 314 which is provided with spaced chambers 315 and 316 the openings 317 and 318 through the wall thereof to the chambers, and the valve seat 319 between the chambers the bottom of the case being provided with a boss 320 which is internally threaded to receive an adjusting screw 321.

The adjusting screw 321 which is threaded into the boss 320 has a pilot 322 which traverses an opening 317 along the bottom of the case for the purpose of increasing or diminishing the area of the opening 317 at this point to increase or diminish the flow of fluid pressure through the opening 317 as the screw 321 is adjusted.

A valve 323 fits to the seat 319, and has a pilot 324 to guide a spring 325, and also a stem 326 extending to the outside of the case to which a push knob 327 is pinned.

A hollow plug 328 is threaded to the case 314 to close the inner end thereof.

The spring 325 is interposed between the plug 328 and the valve 323 to hold the latter upon its seat.

Openings 329 and 330 are provided in the cylinder portion 31 of the base A and correspond to the openings 317 and 318, respectively, in the valve S. Fluid pressure for operating the various parts of the machine is supplied from the main pressure chamber 149 which is supplied with pressure from a suitable source through an inlet pipe 332. The parts operated by fluid pressure delivered from the main pressure chamber 149 are the squeeze piston D, the vibrator cylinder within the cylinder D, the strip cylinder G and the vibrator mounted within the table E. The flow of pressure to the squeeze piston D is directly controlled by the valve T. The flow of pressure to the inner cylinder 74 of the piston D for vibrating the table E is controlled by the manual valve S and the supply of pressure to the strip cylinder G and to the vibrator within the table E is directly controlled by the valve P. The operation of the valve T is controlled by a trip-valve N which is actuated by movement of the arm C to operative position and by the timer J which causes the restoration of the valves T and N to their normal positions after pressure has been applied to the squeeze piston D for a predetermined length of time. A regulator K is interposed between the valve T and the piston D to vary the rate of flow of fluid to the piston. The strip valve P which establishes communication between the main pressure chamber 149 and the strip cylinder G and the vibrator in the table E is operated through the control valve O similar in construction to the valve N and adapted to be actuated in one direction by the arm C in its movement to inoperative position. The valve O, is restored to normal position by fluid pressure from the chamber 149 controlled by the manually operated valve R.

The pressure to the vibrator cylinder 74 upon the interior of the squeeze piston D is supplied from the chamber 149 through a pipe 331 leading to the valve S which is mounted upon the cylinder of the piston D and communicates with the interior chamber 76 through the opening 329. Pressure is supplied to the squeeze piston D from the chamber 149 through a pipe 362 leading to the valve T, a pipe 363 leading from the valve T to the regulator K and through a pipe 199 leading from the regulator K to the piston D. Pressure is supplied from the chamber 149 to the strip valve G through a pipe 349 leading from the chamber 149 to the valve P and a pipe 348 leading from the valve P to the cylinder G and pressure is delivered to the vibrator mounted in the table E through a pipe 359 communicating with the pipe 348 and communicating with the vibrator valve L which communicates with the vibrator through the flexible pipe 230, the telescopic connection N and the pipe 87. Pressure connections from the chamber 149 to the valves N and O is made through a pipe 337 leading from the chamber 149 and a pipe 334 connected to the two valves. Pressure and exhaust connections are made from the valve N to the valve T through pipes 335 and 336 connecting the valves and the valve N is connected to the timer J through a pipe 345. Pressure supply and exhaust connections are made from the valve O and the valve P to operate the same through pipes 341 and 342 and pressure is supplied to the valve O to shift the same back to normal position after its actuation by the arm C through the pipe 331 leading from the chamber 149 and the pipe 353 connecting the pipe 331 to the manually operated valve R and a pipe 354 leading from the valve R to the valve O.

The operation of this machine is as follows:

A suitable squeeze plate is secured to the under side of the plate 66 and is adjusted vertically to suit the pattern to be used, by means of the adjusting screws 64 and locked in adjusted position by the screw 62 and the lock-nuts 65. The pattern is mounted on the table E, and the strip bar adjusting screws 138 are adjusted to suit the flask to be used. The arm C is now swung around on the column B, in the direction of the arrow shown in Fig. 7, to substantially at an angle of ninety degrees from the position shown in Fig. 7, but neither the valves N nor O are affected by this move. This operation is merely to get the front part of the arm C out of the way in order to place the flask on the table E and fill the same with sand, or to remove the completed mold, and to provide head room to handle molds and flasks by overhead trolleys, cranes, etc.

Now place the flask on the table E and fill the same with sand, and perform, at this stage, such other operations as necessarily pertain to or are convenient on the particular pattern used.

Now push inward on the knob 327 of the push valve S, preferably with one knee for rapid operation of the machine. When the knob 327 is so pushed inward, the valve 323 is pushed from its seat 319 and communication is now established between the chambers 315 and 316.

The opening 330 to the valve S is connected to the main fluid pressure chamber 149 by the pipe 331, and the chamber 149 is supplied with fluid pressure from some outside source by the pipe 332. When communication is so established between the chambers 315 and 316, fluid pressure flows from the chamber 149, through the pipe 331 into the opening 330, into the opening 318, into the chamber 316, passing through the now open valve 323, into the chamber 315, into the openings 317 and 329. This opening 329 extends through the portion 31 of the base A, and through the inner and outer walls of the piston D, and through a boss 74ª which is interposed between these inner and outer walls, and through the piston portion 75, and terminates in the upper end of the chamber 76.

Exhaust ports 333 are located in the inner cylinder portion 74 at a suitable distance from the bottom, and this distance determines the stroke of the table E.

After the fluid pressure passes through the opening 329, it enters the chamber 76, fills the same, and moves the table E upward within the piston D until the lower end of the cylinder portion 75 uncovers the exhaust ports 333, whereupon the fluid pressure exhausts through the ports 333, and into the open outer chamber 74ᵇ of the squeeze piston D where it has free access to the open air. When table E so moves upward the opening 329 is closed by the portion 75, and the flow of fluid pressure into the chamber 76 is interrupted, but the ports 333 being open, the fluid pressure will exhaust from the chamber 76 and the table suddenly drops down due to its own weight and strikes the anvil collar 68 which causes a jar of the table E and consequently of the mold thereon.

As soon as the table so strikes and is in its lowest position, as shown in the drawings, the openings 329 will again register and the table E will again rise as before, and this jarring operation is repeated and continues to repeat as long as the knob 327 is pushed, which period of jarring is determined by the pattern, condition of sand, etc.

When the mold is sufficiently jarred, the knob 327 is released whereby communication between the chambers 315 and 316 is interrupted by the valve 323 and the jarring stops.

Now the surplus sand is removed from the top of the flask, and the arm C is brought into the position shown in Fig. 7, the stop block 49 butting the stop pin 50 to stop the arm C in substantially this central position, although considerable variation from this position does not affect the operation.

When the arm C is so brought to this central position, the finger 54 pushes the lever arm 249 of the valve N in the direction of the arrow thereby moving the valve 236 in the direction opposite the arrow shown in Fig 18.

This movement of the valve 236 establishes communication between the openings 245 and 261 through the port 257 now moved to a new position, and also between 246 and 262 through the port 258 now moved to a new position, so that a fluid pressure can now flow from the pipe 334 into the openings 245, 241 and 261, and the pipe 335, and the exhaust opening 247, is now closed; the opening 262 is closed to the opening 245 but is open to the exhaust opening 246.

The pipe 337 connects the pipe 334 with the chamber 149 at 338.

At this stage of the operation, the mechanism of the valve O which has the same reference numbers as the valve N are so positioned as to form connections as shown in Fig. 20 where the pipe 334 and the port 258 and the opening 262 and the pipe 336 are in communication, while the port 257 and the opening 261 and the opening 247 are in communication.

At this stage fluid pressure flows from the chamber 149 through the pipe 337, to the pipe 334; then flows toward the valves N and O. At the valve N, the fluid pressure enters from the pipe 334 through the openings 241 and 245, flows through port 257 and the opening 261 to the pipe 335 and into the valve T (Fig. 17) where it pushes the pistons 157 and the valve 162 inward from the position shown in Fig. 17.

This movement of the valve 162 establishes communication between the openings 182 and 183 through the chamber 164. This same movement of the valve also closes the opening 339 to the opening 173 and the chamber 171, and uncovers the opening 340 and establishes communication between the chamber 155 and the opening 340.

The pipe 336 is connected to the valve T, opposite the pipe 335, and permits exhaust of fluid pressure from the cylinder, at this end of the valve T, through this pipe 336 and the ports 262, 240, 258, and exhausts through the port 246.

At the valve O, the mechanisms of which are now in the positions shown in Fig. 20, the fluid pressure enters through the pipe 334 and flows through the ports 241, 245, 258, 240, 262, and through the pipe 341 to the strip valve P.

The pipe 342 establishes communication between the exhaust port 247 through the ports 261, 239, 257 and 238, and the end of the valve P. Fluid pressure now flows from the pipe 334 through the valve O and the pipe 341 into the recess 299 of the cylinder 291 (Fig. 22), and pushes the piston 297 forward in the cylinder, thereby establishing communication between the exhaust port 277 and the slot 276 through the ports 288 and 289. The exhaust is now open at this point.

The pipe 362 opens into the chamber 149 while the pipe 363 communicates with the opening 197 of the adjuster K, as shown in Fig. 10.

Fluid pressure now flows from the chamber 149 through the pipe 362 and the valve 162 and the pipe 363 and the adjuster K, where it may be adjusted to any desired capacity by manipulating the adjusting screw 201, to suit the pressure and volume of fluid pressure required for squeezing the mold.

From the adjuster K fluid pressure now flows through the opening 198, to the pipe 199 which passes through the cap H and connects with the cap 151, and into the bottom of the squeeze piston D through the chamber 152 and the opening 153.

The pipe 344 is now closed by the valve 169 in the valve T.

The piston D, with the table E and the pattern and the mold thereon, are now forced upward until the upper part of the mold touches the squeeze plate mounted on the adjusted plate 66. At this point the squeezing of the mold begins and continues until the pressure in the cylinder below the piston D overcomes the compression of the spring 194 in the pressure regulator J which spring 194 may be adjusted to any pressure desired for squeezing any particular mold by the adjusting plug 191.

When the pressure on the piston D increases sufficiently to overcome the compression of the spring 194, the washer 188 rises from its seat and the fluid pressure flows from the opening 179 in the cover of the valve T (Fig. 17) through the opening 186, (Fig. 28), flows under the washer 188 and into the pipe 345 which communicates with the central bore of the valve N (Fig. 18), and moves the piston 253 and the valve 236 back to the position shown in Fig. 18 whereby communication is established between the pipes 334 and 336 through the ports 245, 241, 258, 240 and 262, and also between the pipe 335 and the exhaust 238, through the ports 261, 239, 257, 238 and the exhaust 247.

Fluid pressure now flows from the chamber 149 through the pipe 334, through the valve N, and through the pipe 336 into the end of the valve T whereby the pistons 157 and the valves 162 and 169 are moved back to their original position, as shown in Fig. 17, and the fluid pressure below the piston D exhausts through the pipe 344 and the ports 339, 173, 171, 172 and 340, and raises the hinged cover 181 and escapes to the open air.

While the fluid pressure enters the valve T on one end through the pipe 336 and moves the pistons 157, the exhaust from the other end flows through the pipe 335 to the exhaust opening 238, as stated.

When the pistons 157 are so moved, the valve 162 also closes the port 183 and shuts off the fluid pressure supply to the squeeze piston D.

The squeezing operation is now complete, and the piston D, with the table E and the mold thereon, moves down to its original and lowest position due to its own weight; the exhaust being still open through the hinged cover 181.

The next step is to strip the mold from the pattern. This is accomplished by rotating the arm C on the column B in the direction shown by the arrow in Fig. 7, similar to the analogous operation previously set forth.

When the arm C is so rotated, the finger 55 engages the lever 249 on the valve O (Fig. 18) and moves the same in the direction of the arrow whereby the piston 253 and the valve 236 are moved in an opposite direction through the lever 250 and the pin 251. Communication is now established between the pipes 334 at the valve O and 342 in the same manner as between the pipes 334 and 335 previously described in connection with the valve N, and also between the pipe 341 and the exhaust 246 previously described in connection with the valve N.

Fluid pressure now flows from the pipe 334 through the valve O, to the pipe 342, to the valve P, and into the opening 292 where it acts upon the piston 297 and moves the valve 266 forward to the position shown in Fig. 22, thereby closing the previously open exhaust port 277 and establishing communication between the ports 276 and 274 through the ports 288, 289, 290 and 275.

The port 276 is in communication with the pipe 348, one end of which connects to the boss 271 while the other end thereof is screwed into one end of the central opening in the cap H.

The port 274 is in communication with the pipe 349 one end of which is screwed into the case A and opens into the chamber 149, while the other end thereof is connected to the boss 269. Either a cap or a nozzle or other device may be secured to the boss 270, either to close the slot 274 at this end or take therefrom some fluid pressure which may be used outside of the operation of the machine proper.

The adjusting screw 279 with the pilot 282 may be screwed up or down in its opening so that either the full force of the fluid pressure, or any portion thereof, may be discharged at the boss 270, while a similar operation of the adjusting screw 278 permits of admitting fluid pressure of any capacity to the valve P through the pipe 349.

Now, fluid pressure, adjusted to suit, enters the valve P through the pipe 349 and leaves the valve P through the pipe 348 as previously stated; then flows into the central opening in the cap H and into the chamber 148 therein; then up into the opening 120 of the piston rod. From this chamber 148, the fluid pressure also flows to the pipe 359 which connects to the vibrator valve L (Fig. 13).

When the fluid pressure so flows to both of these places at the same time, both the strip mechanism and the vibrator mechanism are supplied with fluid pressure, but since the vibrator mechanism is of light weight structure and has a comparatively small volume to be filled with fluid pressure, and the strip mechanism is of heavier construction and has a comparatively larger volume to be filled with fluid pressure, and the strip mechanism being arranged to start slowly, the vibrator mechanism will begin to operate before the strip mechanism does and vibrate the table and the mold a short time before the actual stripping of the mold begins.

When fluid pressure flows in the pipe 349, it enters the chamber 218 in the valve L (Fig. 13) through the opening 208; the valve 204 is held open by the plunger 211 and permits this fluid pressure to flow into the opening 207 and into the pipe 229. It then flows into the tube 230, then into the pipe 228, then into the sleeve 223, then into the pipe 84, and then into the chamber 81 of the vibrator (Fig. 14).

The vibrator mechanism is normally held in the position shown in Fig. 14 as previously stated. When fluid pressure flows into the chamber 81, it flows from there into the port 87, then into the groove 92 in the piston 91, then through the ports 94 into the recess between the end of the piston 91 and the inner face of the cap 85 and fills this chamber and moves the piston 91 toward the other end of the cylinder until it strikes the block 90 which causes a sharp vibration of the table E. While the piston is so moving, the groove 93 registers with the exhaust opening 83, and whatever fluid pressure is in the cylinder chamber at this end exhausts therefrom through the opening 95, and since these openings 95 face downward, the exhaust therefrom tends to blow sand, etc., from the top wall 41 of the base A.

When the piston reaches this end of its stroke, the groove 93 registers with the port 88, fluid pressure then enters this port 88 from the chamber 81 and flows through the groove 93 and the openings 95 into the chamber which contains the spring 96, fills the same and moves the piston 91 in the opposite direction until it strikes the block 89 which causes another sharp vibration of the table E. This back and forth movement of the piston 91, and the consequent impacts and vibrations caused thereby continue until the flow of fluid pressure is shut off as will appear hereinafter.

When fluid pressure flows through the opening 120 in the piston rod 105, it leaves the same at its upper end and enters the chamber 350 and fills the same.

It is desirable that the stripping of the mold be started very slowly and increased gradually.

For that purpose the rod 126, slightly smaller in diameter than the opening 120, extends into the opening 120 and leaves a small area section for the fluid pressure to flow through, thereby preventing a sudden rise of the cylinder G but causing a very slow and easy rising start thereof. The piston rod 105, being rigidly secured to the stationary base A by means of the cap H, cannot move downward, therefore the cylinder G must move upward in the column B when the chamber 350 is filling with fluid pressure.

The cylinder G moves upward slowly until it reaches such a height that the lower portion of the rod 126 leaves the opening 120. At this stage, the cylinder G begins to move upward faster, and such upward speed continues to increase due to the conical lower end of the rod 126 and consequent gradual increase of area between the rod 126 and the opening 120, until the point of the conical end leaves the opening 120, at which stage the cylinder G moves upward rapidly to the height desired, which height may be adjusted by manipulating the sleeve 128 so that the distance between the lower end of the sleeve 128 and the upper end of the collar 351 represents the strip distance.

The collar 351 and the spring 352 are provided as a bumper.

The rod 126 may be adjusted up and down to enter the opening 120 to a greater or lesser depth to suit the distance required to carry on the slow stripping motion.

The strip arm F is rigidly secured to the cylinder G and must rise therewith.

The bracket 222 is secured to the arm F and must rise therewith.

As the arm F rises with the cylinder G, the bars 132 and the strip bars 137 also rise and strip the mold from the pattern as is usually done in molding machines.

While the arm F is so rising, the bracket 222 also rises until it contacts the nuts 220 in the rod 219.

Further rising of the bracket 222 moves the nuts 220, and consequently the rod 219 and the plunger 210, upward until the stem 213 of the valve 204 is opposite the diametrically smallest portion of the tapered portion 211. At this point the valve 204 is closed and communication between the pipes 349 and 229 is interrupted and the vibrator action stops. The nuts 220 are adjusted to suit the time required to vibrate the mold.

The plunger 210 is brought back to its original position when the bracket 222 and the arm F return to their original positions.

When the mold is so stripped from the pattern and raised a suitable distance above the table E, it is removed by any suitable means and the knob 313 of the valve R is pushed in whereby communication is established between the pipes 353 and 354 through the now open valve 310 and the chambers 303 and 304.

Fluid pressure now flows from the pipe 331 into the pipe 353, through the valve R, into the pipe 354, through the pipe 354 to the valve O, and then into the bore of the valve O where it acts against the piston 253 and moves the valve 236 back to the position shown in Fig. 18.

Communication is now established between the pipes 334 and 341 through the ports 245, 241, 258, 240 and 262, and between the pipe 342 and the exhaust port 246.

Fluid pressure now flows from the pipe 334 to the pipe 341 and to the recess 299 where it acts against the piston 297 and moves the valve 266 to the position where the exhaust port 277 registers with the port 288, and the port 289 registers with the port 276. The port 275 is now closed and the supply of fluid pressure is cut off, and the fluid pressure from the strip cylinder G and from the vibrator exhausts through the pipe 348, and the opening 277.

Having described our invention, we claim:

1. A molding machine comprising a base having a cylinder and a column and a squeeze arm, a squeeze piston operatively mounted in said cylinder, a table operatively mounted in said piston, and a strip mechanism having the operating member thereof mounted in said column and the strip bar actuating member thereof extending to each side of said cylinder and operatively engaging said strip bars.

2. A molding machine comprising a base having a cylinder and a column and a squeeze arm, a squeeze piston operatively mounted in said cylinder, a table operatively mounted in said piston, a strip mechanism mounted in said column, a source of fluid pressure to actuate said piston and table and strip mechanism, means for manually admitting fluid pressure to said table, and means for automatically admitting and exhausting fluid pressure to and from said cylinder and strip mechanism in timed relation with each other.

3. A molding machine comprising a base having a cylinder and a column, a rotatable arm mounted on said column, a squeeze piston operatively mounted in said cylinder, a table operatively mounted in said piston, a strip mechanism, a source of fluid pressure to actuate said piston and table and strip mechanism, means for manually admitting fluid pressure to said table, means for automatically admitting and exhausting fluid pressure to and from said cylinder and strip mechanism in timed relation with each other, means on said arm to start the operation of said means for admitting and exhausting fluid pressure when said arm is rotated to squeeze position, and means for manually stopping the operation of said means for admitting and exhausting fluid pressure.

4. A molding machine comprising a base and a table and a strip mechanism and a squeeze arm, a plate adjacent the squeeze face of said arm, a guide pin slidably mounted in said arm and secured to said plate, screws threaded into said arm for adjusting said plate, and means for locking said guide pin in adjusted position.

5. A valve mechanism for a fluid pressure actuated molding machine comprising a source of fluid pressure for said valve mechanism, a manually operated jar valve, a manually operated starting valve, a squeeze valve actuated by fluid pressure from said starting valve, a second manually operated starting valve, a strip and vibrator valve actuated by fluid pressure from said second starting valve, and a manually operated stopping valve.

6. A valve mechanism for a fluid pressure actuated molding machine comprising a source of fluid pressure for said valve mechanism, a manually operated jar valve, a manually operated starting valve, a squeeze valve actuated by fluid pressure from said starting valve, a second manually operated starting valve, a strip and vibrator valve actuated by fluid pressure from said second starting valve, a manually operated stopping valve, and a main stop valve actuated by fluid pressure from said manually operated stopping valve.

7. A fluid pressure actuated molding machine comprising a base, a squeeze piston, a table, a rotatable squeeze arm, a strip mechanism, a vibrator mechanism, a source of fluid pressure, and a valve mechanism comprising a manually operated jar valve, a squeeze valve opened by the rotation of said arm to its squeeze position, a pressure regulator adapted to close said squeeze valve when said squeeze piston exerts a certain pressure upon a mold, a strip and vibrator valve opened by the rotation of said arm to its out of the way position, means for manually closing said strip and vibrator valve, and a valve at the source of said fluid pressure and opened by the first said rotation of said arm and closed by fluid pressure from said strip and vibrator valve.

8. A valve mechanism for a fluid actuated molding machine comprising a source of fluid pressure, a starting valve means, a pressure adjusting valve, a squeeze valve opened by fluid pressure from said starting valve means and closed by adjusted fluid pressure from said pressure adjusting valve, a valve at said source of fluid pressure, and means for opening and closing the last said valve.

9. A valve mechanism for a fluid actuated molding machine comprising a source of fluid pressure, a starting valve means, a valve at said source of fluid pressure, a squeeze valve opened by fluid pressure from said starting valve means, a fluid pressure regulator between said valve at the source of fluid pressure and the inlet at said squeeze valve, a pressure adjuster adapted to shut off fluid pressure supply to said squeeze valve and open the exhaust thereof, and means for opening and closing said valve at the source of fluid pressure.

10. A valve mechanism for a fluid pressure actuated molding machine, comprising an adjustable jar valve adapted to transform said fluid pressure to a capacity adapted for jarring of a mold, an adjustable squeeze valve means adapted to transform said fluid pressure to a capacity adapted for squeezing said mold, and a strip and vibrator valve means adapted to transform said fluid pressure to a capacity adapted for stripping of said mold.

11. In a molding machine, the combination of a base and a table and a strip and vibrator mechanisms and a source of fluid pressure, with a squeeze mechanism comprising a rotatable squeeze arm, a squeeze piston, and a valve mechanism opened by the rotation of said squeeze arm to squeeze position to operate said piston.

12. In a molding machine, the combination of a base and a table and a strip and vibrator mechanisms and a source of fluid pressure, with a squeeze mechanism comprising a rotatable squeeze arm, a squeeze piston, and a valve mechanism adapted to automatically close when the pressure on said piston reaches a certain point.

13. In a molding machine, the combination of a base and a table and a strip and vibrator mechanisms and a source of fluid pressure, with a squeeze mechanism comprising a rotatable squeeze arm, a squeeze piston, and a valve mechanism opened by the rotation of said squeeze arm to squeeze position to operate said piston and adapted to automatically close when the pressure on said piston reaches a certain point.

14. In a molding machine, the combination of a base and a table and a strip and vibrator mechanisms and a source of fluid pressure, with a squeeze mechanism comprising a rotatable squeeze arm, a squeeze piston, a valve mechanism opened by the rotation of said squeeze arm to squeeze position to operate said piston and adapted to automatically close when the pressure on said piston reaches a certain point, and means for adjusting said automatic closing pressure.

15. In a molding machine, the combination of a base and a table and a squeeze arm and a squeeze and a vibrator mechanism and a source of fluid pressure, with a strip mechanism comprising a movable cylinder, a strip arm secured to said cylinder, strip bars operatively connected with said strip arm, and a strip valve opened by the rotation of said squeeze arm to its out of the way position to start the stripping operation.

16. In a molding machine, the combination of a base and a table and a squeeze arm and a squeeze and a vibrator mechanism and a source of fluid pressure, with a strip mechanism comprising a movable cylinder, a strip arm secured to said cylinder, strip bars operatively connected with said strip arm, and a valve mechanism adapted to automatically close when said strip bars reach a certain height.

17. In a molding machine, the combination of a base and a table and a squeeze arm and a squeeze and a vibrator mechanism and a source of fluid pressure, with a strip mechanism comprising a movable cylinder, a strip arm secured to said cylinder, strip bars operatively connected with said strip arm, and a valve mechanism opened by the rotation of said squeeze arm to its out of the way position to start the stripping operation and adapted to automatically close when said strip bars reach a certain height.

18. In a molding machine, the combination of a base and a table and a squeeze arm and a squeeze and a vibrator mechanism and a source of fluid pressure, with a strip mechanism comprising a movable cylinder, a strip arm secured to said cylinder, strip bars operatively connected with said strip arm, a valve mechanism opened by the rotation of said squeeze arm to its out of the way position to start the stripping operation and adapted to automatically close when said strip bars reach a certain height, and means for adjusting the travel of said strip bars.

19. In a molding machine, the combination of a base and a table and a squeeze and a vibrator mechanism and a source of fluid pressure, with a strip mechanism comprising a movable cylinder, a stationary hollow piston rod secured to said base, a piston secured to said rod, means for admitting and exhausting fluid pressure to and from said cylinder through said hollow rod, and strip bars on opposite sides of the table operatively connected with said cylinder.

20. In a molding machine, the combination of a base and a table and a squeeze and a vibrator mechanism and a source of fluid pressure, with a strip mechanism comprising a cylinder operatively mounted in said base, a stationary hollow piston rod secured to said base, a piston on said rod, strip bars operatively connected with said cylinder, means for admitting and exhausting fluid pressure to and from said cylinder through said rod, and means for regulating said admittance of fluid pressure to actuate said strip mechanism slowly at first and increasingly after a certain strip height is attained.

21. In a molding machine, the combination of a base and a table and a squeeze and a vibrator mechanism and a source of fluid pressure, with a strip mechanism comprising a cylinder operatively mounted in said base, a stationary and hollow piston rod secured to said base, a piston on said rod, means for admitting and exhausting fluid pressure to and from said cylinder through said rod, strip bars operatively connected with said cylinder, means for admitting and exhausting fluid pressure to and from said cylinder through said rod, means for regulating said admittance of fluid pressure to actuate said strip mechanism slowly at first and increasingly after a certain strip height is attained, and means for adjusting said strip height.

22. In a molding machine, the combination of a base and a table and a squeeze and a vibrator mechanism and a source of fluid pressure, with a strip mechanism comprising a cylinder operatively mounted in said base at one side of the table, a stationary hollow piston rod secured to said base, a piston on said rod, means for admitting and exhausting fluid pressure to and from said cylinder through said rod, a strip arm secured to said cylinder and having extensions adjacent opposite sides of said table, push bars operatively connected with said extensions, and strip bars secured to said push bars.

23. In a molding machine, the combination of a base and a table and a squeeze and a vibrator mechanism and a source of fluid pressure, with a strip mechanism comprising a cylinder operatively mounted in said base, a stationary hollow piston rod secured to said base, a piston on said rod, means for admitting and exhausting fluid pressure to and from said cylinder through said rod, a strip arm secured to said cylinder and extending to each side of said table, push bars operatively connected with said extensions, strip bars secured to said push bars, means for regulating said admittance of fluid pressure to actuate said strip mechanism slowly at first and increasingly after a certain strip height is attained, and means for adjusting said strip height.

24. In a molding machine, the combination of a base and a table and a squeeze mechanism and a strip mechanism and a source of fluid pressure, with a vibrator mechanism having the plunger thereof operatively mounted within said table and actuated by fluid pressure admitted simultaneously with the admission of fluid pressure to said strip mechanism.

25. In a molding machine, the combination of a base and a table and a squeeze mechanism and a strip mechanism, and a source of fluid pressure, with a vibrator mechanism having at least one anvil thereof mounted in said table and having the plunger thereof operatively mounted within said table and actuated by fluid pressure admitted simultaneously with the admission of fluid pressure to said strip mechanism, and means for adjusting the duration of the action of said vibrator.

26. In a molding machine, the combination of a base and a table and a squeeze mechanism and a source of fluid pressure, with a strip mechanism, a vibrator mechanism having the plunger thereof operatively mounted within said table and provided with means to retain said plunger in starting position while the same is not operating, and means for simultaneously admitting fluid pressure to said strip mechanism and said vibrator mechanism.

27. In a molding machine, the combination of a base and a table and a squeeze mechanism and a source of fluid pressure, with a strip mechanism, a vibrator mechanism, means for simultaneously admitting fluid pressure to said strip mechanism and said vibrator mechanism, and means for admitting said fluid pressure to said strip mechanism slowly at the beginning of its operation but admitting said fluid pressure to said vibrator mechanism at full force during its entire action.

28. In a molding machine, the combination of a base and a table and a squeeze mechanism and a source of fluid pressure, with a strip mechanism, a vibrator mechanism, means for simultaneously admitting fluid pressure to said strip mechanism and said vibrator mechanism, means for admitting said fluid pressure to said strip mechanism slowly at the beginning of its operation but admitting said fluid pressure to said vibrator mechanism at full force during its entire action, means for adjusting the duration of said action of the vibrator, and means for adjusting the duration of said action of the strip mechanism.

29. In a molding machine, the combination of a base and a table and a squeeze mechanism and a source of fluid pressure, with a strip mechanism, a vibrator mechanism, means for simultaneously admitting fluid pressure to said strip mechanism and said vibrator mechanism, means for admitting said fluid pressure to said strip mechanism slowly at the beginning of its operation but admitting said fluid pressure to said vibrator mechanism at full force during its entire action, means for adjusting the duration of said action of the vibrator, means for adjusting the duration of said action of the strip mechanism, and means for adjusting the duration of said slow admission of fluid pressure to the strip mechanism.

30. A molding machine comprising a base, a column on said base, a rotatable squeeze arm journaled on said column, a squeeze piston operatively mounted in said base at one side of the column, a jar table operatively mounted in said squeeze piston, a vibrator mechanism inclosed within said table, a strip actuating means mounted in said column, a strip mechanism operatively connected with said strip actuating means, and means for actuating said squeeze piston, said vibrator mechanism and said strip actuating means.

31. A molding machine comprising a base, a column on said base, a rotatable squeeze arm journaled on said column, a squeeze piston operatively mounted in said base, a jar table operatively mounted in said squeeze piston, a vibrator mechanism for said table, a strip actuating means mounted in said column, a strip mechanism operatively connected with said strip actuating means, means for actuating said squeeze piston and said jar table, and said vibrator mechanism, and said strip actuating means, means for starting said actuation of said squeeze piston by the rotation of said squeeze arm to its squeeze position, and means for automatically stopping said squeeze action when the squeeze pressure reaches a certain point.

32. A molding machine comprising a base, a column on said base, a rotatable squeeze arm journaled on said column, a squeeze piston operatively mounted in said base, a jar table operatively mounted in said squeeze piston, a vibrator mechanism for said table, a strip actuating means mounted in said column, a strip mechanism operatively connected with said strip actuating means, means for actuating said squeeze piston and said jar table and said vibrator and said strip actuating means, means for starting said actuation of the strip and vibrator mechanism by rotation of said squeeze arm to its out of the way position, and means for terminating said strip action.

33. A molding machine comprising a base, a column on said base, a rotatable squeeze arm journaled on said column, a squeeze piston operatively mounted in said base, a jar table operatively mounted in said squeeze piston, a vibrator mechanism for said table, a strip actuating means mounted in said column, a strip mechanism operatively connected with said strip actuating means, means for actuating said squeeze piston and said jar table and said strip actuating means and said vibrator mechanism, means for starting said actuation of said squeeze piston by the rotation of said squeeze arm to its squeeze position, means for automatically stopping said squeeze action when the squeeze pressure reaches a certain point, means for starting said actuation of the strips and vibrator mechanism by the rotation of said squeeze arm to its out of the way position, and means for terminating said strip action and said vibrator action.

34. A molding machine comprising a base, a column on said base, a rotatable squeeze arm journaled on said column, a squeeze arm journaled on said column, a squeeze piston operatively mounted in said base, a jar table operatively mounted in said squeeze piston, a vibrator mechanism for said table, a strip actuating means mounted in said column, a strip mechanism operatively connected with said strip actuating means, means for actuating said squeeze piston and said jar table and said strip actuating means and said vibrator mechanism, means for starting said actuation of said squeeze piston by the rotation of said squeeze arm to its squeeze position, means for automatically stopping said squeeze action when the squeeze pressure reaches a certain point, means for starting said actuation of the strip and vibrator mechanism by the rotation of said squeeze arm to its out of the way position, means for terminating said strip action, means for terminating said vibrator action, means for adjusting the duration of said strip action, and means for adjusting the duration of said vibrator action.

35. A fluid pressure actuated molding machine comprising a base, a jar table on said base, a squeeze arm on said base, a squeeze mechanism, a strip mechanism, a vibrator mechanism, a source of fluid pressure, valve mechanisms connected to said source of fluid pressure and manually operated to actuate said jar table and automatically operated to start and to stop the squeeze mechanism and also to start and stop the strip and vibrator mechanism.

36. A fluid pressure actuated molding machine comprising a base, a jar table on said base, a rotatable squeeze arm on said base, a squeeze mechanism, a strip mechanism, a vibrator mechanism, a source of fluid pressure, and a valve mechanism connected to said source of fluid pressure and comprising a main valve, manually operated jar valve for said jar table, a squeeze valve opened by the rotation of said squeeze arm, a pressure adjuster to close said squeeze valve, a strip valve opened by the rotation of said squeeze arm and closed manually, and a vibrator valve supplied with fluid pressure by said strip valve and closed by the strip mechanism.

37. A fluid pressure actuated molding machine comprising a base, a table on said base, a vibrator for said table, a squeeze mechanism, a strip mechanism, a source of fluid pressure, a valve means connected to said source of fluid pressure, means for manually opening said valve means to said squeeze mechanism, means for automatically closing said valve means to said squeeze mechanism, means for manually opening said valve means to said strip mechanism simultaneously with said vibrator mechanism, means for manually closing said valve means and means for exhausting said fluid pressure from said fluid pressure actuated elements.

38. A fluid pressure actuated molding machine comprising a base, a table on said base, a vibrator for said table, a squeeze mechanism, a strip mechanism, a source of fluid pressure, a valve means connected to said source of fluid pressure, means for manually opening said valve means to said squeeze mechanism, means for automatically closing said valve means to said squeeze mechanism, means for adjusting the starting and the stopping pressure of said fluid pressure for said squeeze mechanism, means for manually opening said valve means to said strip mechanism simultaneously with said vibrator mechanism, means for adjusting the pressure of said fluid pressure to said strip mechanism to actuate the same slowly at the beginning of its operation, means for adjusting the travel of said strip mechanism, means for adjusting the duration of the action of said vibrator mechanism, means for manually closing said valve mechanism, and means for exhausting said fluid pressure from said fluid pressure actuated elements.

39. A fluid pressure actuated molding machine comprising a source of fluid pressure for said machine, a base having a cylinder and a column, a rotatable squeeze arm journaled on said column, a squeeze plate mounted on said squeeze arm, means for adjusting said squeeze plate in relation to said squeeze arm, a squeeze piston operatively mounted in said cylinder and provided with an anvil flange and with a jar cylinder having inlet and exhaust ports, means for admitting and exhausting fluid pressure to and from said cylinder to actuate said squeeze piston, said valve means connected to said source of fluid pressure and to said squeeze valve means and opened by the rotation of said squeeze arm to squeeze position, a pressure regulator connected with said squeeze valve means and adapted to be adjusted to different pressures and adapted to close said squeeze valve means when the squeeze pressure reaches a certain point, a jar table operatively mounted in said jar cylinder and provided with a hollow piston portion having an inlet port and with a vibrator mechanism mounted therein, a manually operated valve connected to said source of fluid pressure and to said inlet ports in said squeeze piston and said jar table, a strip cylinder operatively mounted in said column, a stationary hollow piston rod secured to said base, a piston on said piston rod, means mounted in said column to adjust the travel of said strip cylinder, a valve means connected to said source of fluid pressure and to said hollow piston rod and opened by the rotation of said squeeze arm to its out of the way position and closed manually.

40. A fluid pressure actuated molding machine comprising a source of fluid pressure for said machine, a base having a squeeze cylinder and a column, a rotatable squeeze arm journaled on said column, a squeeze plate mounted on said squeeze arm, means for adjusting said squeeze plate in relation to said squeeze arm, means for locking said squeeze plate in position, a squeeze piston operatively mounted in said cylinder and provided with an anvil flange and with a jar cylinder having inlet and exhaust ports, means for admitting and exhausting fluid pressure to and from said squeeze cylinder to actuate said squeeze piston, squeeze valve means connected to said source of fluid pressure and to said squeeze valve means and opened by the rotation of said squeeze arm to squeeze position, a pressure regulator connected with said squeeze valve means and adapted to adjust said fluid pressure to different pressures at the inlet to said squeeze cylinder, a pressure adjuster adapted to close said squeeze valve means when the squeeze pressure reaches a certain point, a jar table operatively mounted in said squeeze piston and provided with a hollow piston portion having an inlet port and with a vibrator mechanism mounted therein, a manually operated valve connected to said source of fluid pressure and to said inlet ports in said squeeze piston and said jar table, a strip cylinder operatively mounted in said column, a stationary hollow piston rod secured to said base, a piston on said piston rod, means for adjusting the travel of said strip cylinder mounted in said column, a valve means connected to said source of fluid pressure and to said hollow piston rod and opened by the rotation of said squeeze arm to its out of the way position and closed manually, and means for slowly admitting fluid pressure to the said strip cylinder during a period of its stroke.

JOHN T. STONEY.
KLEMENS PURWIN.